United States Patent [19]

Ohmori et al.

[11] Patent Number: 5,375,898
[45] Date of Patent: Dec. 27, 1994

[54] ARTICLE HOLDING ARRANGEMENT

[75] Inventors: Toshiyuki Ohmori, Sakura; Nobuyuki Kamishioiri, Shimodate; Shigemi Hatanaka, Funabashi; Yasuhiro Honma, Sugito; Hiroaki Kobayashi, Chiba, all of Japan

[73] Assignee: Kao Corporation, Japan

[21] Appl. No.: 985,638

[22] Filed: Dec. 3, 1992

[30] Foreign Application Priority Data

Oct. 27, 1992 [JP] Japan .............. 4-080139[U]

[51] Int. Cl.⁵ .............................. B66C 1/44
[52] U.S. Cl. .................... 294/88; 294/27.1
[58] Field of Search ........... 294/86.4, 88, 119.1, 294/65.5, 902, 27.1, 34; 901/31, 36, 39; 335/285, 295

[56] References Cited

U.S. PATENT DOCUMENTS

| | | | |
|---|---|---|---|
| 3,145,595 | 8/1964 | Mauck | 294/65.5 X |
| 3,198,566 | 8/1965 | Floros et al. | 294/65.5 |
| 3,477,050 | 11/1969 | Hinger | 294/65.5 X |
| 3,490,577 | 1/1970 | Grikscheit | |
| 3,520,769 | 7/1970 | Baker | |
| 3,711,912 | 1/1973 | Teske et al. | |

FOREIGN PATENT DOCUMENTS

| | | |
|---|---|---|
| 0222175 | 5/1987 | European Pat. Off. |
| 0359035 | 3/1990 | European Pat. Off. |
| 2177274 | 11/1973 | France |
| 2342918 | 9/1977 | France |
| 51-14952 | 5/1976 | Japan |
| 59-222762 | 12/1984 | Japan |
| 2-46130 | 3/1990 | Japan |
| 1007968 | 3/1983 | U.S.S.R. .............. 294/88 |
| 1106628 | 8/1984 | U.S.S.R. .............. 294/65.5 |
| 1404336 | 6/1988 | U.S.S.R. .............. 294/88 |
| 1484709 | 6/1989 | U.S.S.R. .............. 294/88 |
| 1553372 | 3/1990 | U.S.S.R. .............. 901/39 |

*Primary Examiner*—Dean J. Kramer
*Attorney, Agent, or Firm*—Austin R. Miller

[57] ABSTRACT

An article holding arrangement includes an article holder which defines an article holding portion, is formed of an urethane type foamed body and having a higher density at an outer skin portion than that of a core portion. The article holder also includes an article fixing device for holding an article set in an article holding portion of an article holder with an article holding member, which comprises a first magnet, to which the article holding member is fixed, movably supported on the article holder for movement in an article holding direction, a second magnet supported on the article holder in opposition to the first magnet, and the first and second magnets being provided the same magnetic poles at mutually opposing poles. The article holding arrangement further includes a damping device for preventing articles transported through a transportation line in series, which comprises a damping magnets arranged at the mutually mating portions of the articles adjacent along the transportation line, which damping magnets of adjacent articles are provided the same polarities at the mutually opposing magnetic poles.

9 Claims, 12 Drawing Sheets

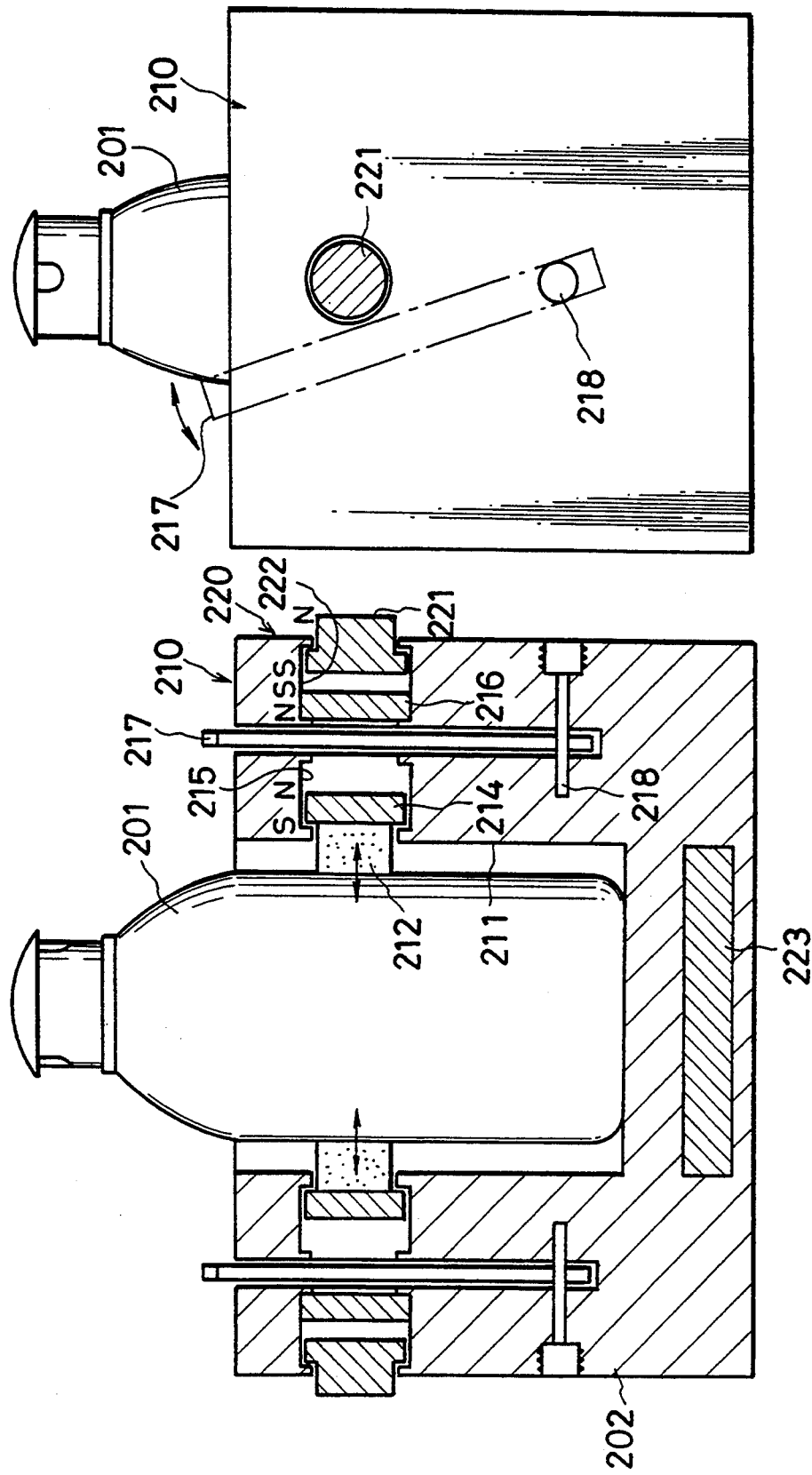

ARTICLE HOLDING ARRANGEMENT

BACKGROUND OF THE INVENTION

1. Field of the Invention

The present invention relates to an article holding arrangement suitable for holding an article during transportation, storage or so forth of the articles. More particularly, the invention relates to an article holding arrangement which can hold the article during transportation, storage or so forth of the articles with improved durability and with capability of avoidance of collision with adjacent articles during transportation or storage.

2. Description of the Related Art (A) Article Holder

Conventionally, there have been proposed article holders such as that disclosed in Japanese Unexamined Patent Publication (Kokai) No. 59-222762. Such article holder is typically formed through cutting of a hard resin material, such as polyethylene, polypropylene or so forth.

However, the article holder made of the hard resin is difficult to reduce in weight. As well, since the hard resin holder cannot provide damping and sound absorbing effect, it may cause rebounding upon collision with adjacent holders while a plurality of holders are arranged in side-by-side relationship with while holding the articles for transportation, storage or so forth.

On the other hand, Japanese Examined Patent Publication (Kokoku) 51-14952 discloses a damping material of foamed polyurethane. However, the disclosed damping material is adapted to be used when placed in a packing container. Therefore, it has not been suggested to form the article holder solely of the damping material. Furthermore, the disclosed damping material has a soft surface to cause a problem in durability. Also, since liquid, such as water, liquidous detergent and so forth may easily penetrate into the void in the formed material, variation of weight of the damping material can be caused due to penetration of such liquid to the extent that the variation may serve as a disturbance for weight check of the article held therein.

(B) Article Fixing Device

In the prior art, there have been proposed article fixing devices, such as that disclosed in Japanese Unexamined Patent Publication No. 59-222762. The disclosed article fixing device is provided with two concave surfaces defining an article holding region of an article holder, with a projection projecting from one of the concave surfaces and a bias spring on the other concave surface for urging the article set in the article holding region toward the projection, for holding the article set in the article holding region of the article holder.

However, the foregoing prior art encounters the following problems as set out in ①~⑤.

① Since the article is biased by resilient deformation of the spring, it becomes necessary to regularly replace the spring. This inherently increases frequency of maintenance.

② Since the article is required to be maintained at the depressed position toward the projection with an appropriate depression force, it becomes difficult or even impossible to appropriately hold when the configuration and/or size of the article is changed.

③ Since the article is held by depression in one direction, i.e. from the spring side to the projection side, it becomes difficult or even impossible to center the article within the article holding region when the configuration and/or size of the article is changed.

④ When a plurality of article holders are transported in line through a transporting line, the adjacent article holders may collide to generate collision or friction noise.

⑤ When the article is set in the receptacle cavity of the article holder, the article is pressed thereinto with frictional contact with the spring and the projection to possibly form scratches on the article and to cause wearing of the spring and the projection. This further increases frequency of maintenance.

(3) Article Damping Device

In the prior art, there has been proposed a damping device for the article, such as that disclosed in Japanese Unexamined Utility Model Publication No. 2-46130. The disclosed damping device includes a damping member formed of an elastic material, such as rubber, provided at least one of a member out of hard members mutually contacting for positioning or so forth and, a sound absorbing member, such as fiber or so forth, provided at least on the contacting surface of the damping member, for damping and absorption of noise.

However, such prior art encounters problems as set out below in sections ①~③.

① Two contacting members contact and collide even though the damping member is disposed therebetween, if such arrangement is applied as a damping device for articles transported through the transporting line in line; it may not avoid collision noise, friction noise or so forth due to collision between the adjacent articles.

② Since the damping member will inherently contact and collide with the counterpart article, it can become worn to shorten the life thereof.

③ Since the damping member is made of an elastic material, such as rubber, it may be worn or suffer fatigue to lower elasticity to shorten life.

SUMMARY OF THE INVENTION

Therefore, it is an object of the present invention to provide an article holder which has both durability and damping ability, is light in weight and does not permit penetration of water, liquidous detergent or so forth.

Another object of the invention is to provide an article fixing device which requires less frequent maintenance and has high adaptivity for variation of configuration and/or size of articles to be held.

A further object of the invention is to provide an article fixing device which can center the article within an article holding region irrespective of variation of the configuration and/or size of the articles to be held.

A still further object of the invention is to provide an article fixing device which can damp collision of article holders.

A yet further object of the present invention is to provide an article fixing device which can firmly hold the article without making scratches on the article, requires less frequent maintenance and has high adaptivity to variation of configuration and/or size of the articles to be held.

A further object of the invention is to provide a damping device which prevents adjacent articles from directly colliding, avoids collision or friction noise otherwise generated between the adjacent articles and can have long life.

A still further object of the invention is to provide a damping device which has improved durability while it satisfactorily avoids collision of the adjacent articles.

[ARTICLE HOLDER]

An article holder, in accordance with the first aspect of the invention, defines an article holding portion, formed of a urethane type foamed body and having a higher density at an outer skin portion than that of a core portion.

According to a second aspect of the invention, the article holder in the first aspect, is further provided with a magnetic body at the bottom thereof.

By the foregoing first aspect of the invention, the following effect can be attained.

① Since the article holder is formed of a urethane type foamed body and with higher density at the outer skin portion than that of the core portion, the outer skin portion becomes hard enough to improve durability. Also, the core portion has a higher foaming degree, a shock absorbing ability or damping ability and can be improved with reducing of the weight. Furthermore, even when the article holder is washed with water, detergent or so forth, penetration of the water, detergent or so forth can be successfully prevented by the high density outer skin portion. This contributes for maintaining accuracy of checking weight of the article held in the article holding portion.

With the foregoing second aspect of the invention, the following effect can be attained.

② By providing the magnetic body (magnet) in the bottom of the article holder, the magnetic body on the article holder can be drawn to a magnetic drawing means (magnetic body) provided in the conveyer, for example, to form a line in the article transporting line, a storage line or so forth, to maintain a stable attitude of the articles during transportation and storage.

[ARTICLE FIXING DEVICE]

According to a third aspect of the invention, an article fixing device for holding an article set in an article holding portion of an article holder with an article holding member, comprises:

a first magnet, to which the article holding member is fixed, movably supported on the article holder for movement in an article holding direction;

a second magnet supported on the article holder in opposition to the first magnet; and the first and second magnets being provided with the same magnetic poles at mutually opposing poles.

In the article fixing device according to the third aspect of the invention, the article fixing device according to the fourth aspect, comprising a pair of article holding members arranged in opposition across the article holding portion of the article holder.

In the article fixing device according to the fourth aspect, the article fixing device according to the fifth aspect of the invention, arranges the pole of the second magnet remote from the first magnet on the outer periphery of the article holder.

With the foregoing third aspect of the invention, the following effects can be attained.

① When the article is set in the article holding portion of the article holder, the article holding members are pushed into the article holder with a force exerted by pushing the article into the article holding portion and overcoming the magnetic repulsive force generated between the opposing same poles (e.g. N poles) of the first magnet and the second magnet so that the article can be firmly held in the article holder. When the article is set in the article holding portion, the article holding members are depressed onto the article by the magnetic repulsive force between the first and second magnets for certainly holding the article.

② Since the depression force for depressing the article holding members onto the article for grasping the latter is generated by the magnetic repulsive force which can be maintained semi-permanently, the frequency of maintenance can be reduced.

③ The shifting stroke against the magnetic repulsive force exerted on the article holding members can be set at a substantial length. Accordingly, it becomes possible to accommodate a variation of size and configuration of the article within the range of the stroke of the article holding members. Also, by the article holding members, an appropriate depression force can be exerted for maintaining an appropriate holding condition. Therefore, good adaptivity for variation of the size and configuration of the article can be attained.

With the fourth aspect of the invention, the following effect can be attained in addition to the foregoing effects of ① to ③.

④ Since the pair of article holding members are opposed across the article holding portion and are biased by substantially equal magnitudes of the magnetic repulsive force to grasp the article therebetween, the article can be successfully centered within the article holding portion irrespective of the configuration and size thereof.

With the fifth aspect of the invention, the following effect can be attained in addition to the foregoing effects ① to ④.

⑤ When the adjacent article holders are sequentially transported through the transportation line, the adjacent articles are prevented from direct collision with each other by the magnetic repulsive force generated between the second magnets exposed to the outer peripheries. Accordingly, the article holders are successfully damped.

According to the sixth aspect of the invention, an article fixing device for holding an article set in an article holding portion of an article holder by means of an article holding member, comprises:

the article holding member being housed within the article holder in a movable position between an article holding position and an article releasing position with respect to the article holding position; and a magnetic switching means for selectively setting the article holding member between the article holding position and the article releasing position by a magnetic drawing effect and/or magnetic repulsing effect.

In the sixth aspect of the invention, the article fixing device according to the seventh aspect of the invention includes the magnetic switching means which comprises:

a first magnet fixed to the article holding member;

a second magnet fixed to the article holder and arranged in opposition to the first magnet;

the first and second magnets being provided the same magnetic poles at mutually opposing poles; and a switching lever made of a magnetic body and arranged for movement across a position where the first and second magnets oppose.

In the sixth aspect of the invention, the article fixing device according to the eighth aspect of the invention includes the magnetic switching means which comprises:

a first magnet fixed to the article holding member;
   a second magnet fixed to the article holder and arranged in opposition to the first magnet;
   a switching lever movable across a position where it opposes the first magnet at a position between the first and second magnets;
   a third magnet carried by the switching lever;
   the first and second magnets being provided with different polarities at the opposing magnetic poles; and
   the first and third magnets being provided the same polarities at the opposing magnetic poles.

In the sixth aspect of the invention, the article fixing device according to the ninth aspect of the invention includes the magnetic switching means which comprises:

means for providing elastic characteristics for the article holding member for normally urging the latter to one of the article holding position or the article releasing position;
   a magnet fixed to the article holding member; and
   a switching lever made of a magnetic body and movable across a position opposing the magnet, the switching lever being adapted to produce a magnetic drawing force in the opposite direction of the elastic characteristics and in a magnitude overcoming the elastic characteristics at the position opposing of the magnet.

In the sixth aspect of the invention, the article fixing device according to the tenth aspect of the invention includes the magnetic switching means which comprises:

means for providing elastic characteristics for the article holding member for normally urging the latter to one of the article holding position or the article releasing position;
   the article holding member being made of a magnetic body:
   a switching lever carrying a magnet and movable across a position opposing to the article holding member, the magnet being adapted to produce a magnetic drawing force with the article holding member in the opposite direction of the elastic characteristics and in a magnitude overcoming the elastic characteristics at the position opposing to the article holding member.

In the sixth aspect of the invention, the article fixing device according to the eleventh aspect of the invention includes the magnetic switching means which comprises:

means for providing elastic characteristics for the article holding member for normally urging the latter to one of the article holding position or the article releasing position;
   a first magnet fixed to the article holding member;
   a second magnet fixed to the article holder and arranged in opposition to the first magnet;
   at least one of the first and second magnets comprising an electromagnet coupled with a switch so that a magnetic drawing force between the magnets active in the opposite direction to the elastic characteristics and in a magnitude overcoming the elastic characteristics is generated when the electromagnet is energized by turning ON of the switch.

With the foregoing sixth to eleventh aspects, the following effects can be attained.

① When the article is set in the article holding portion, the article holding members can be placed at the article releasing position so as not to cause frictional contact. Therefore, scratching will never be caused on the article. Also, wearing of the article holding member is hardly caused. Furthermore, the article set in the article holding portion can be appropriately depressed by the article holding members subsequently switched into the article holding position. Accordingly, the article can be certainly held without forming scratches. Also, the article holder of the shown embodiment requires less frequent maintenance.

② On the other hand, since the motion stroke between the article holding position and the article releasing position of the article holding member can be set sufficiently large, it can accommodate variations of the configuration and/or size of the article. Furthermore, the article set in the article holding portion can be subject to an appropriate depression force via the article holding members switched at the article holding position, and thus appropriately held therein irrespective of the configuration and/or size of the article. Therefore, the present invention can provide high adaptivity for variation of the configuration and/or size of the article.

[DAMPING DEVICE]

According to the twelfth aspect of the invention, a damping device for preventing articles transported through a transportation line in series from directly contacting with adjacent articles, comprises:

damping magnets arranged at the mutually mating portions of the articles adjacent along the transportation line, which damping magnets of adjacent articles are provided the same polarities at the mutually opposing magnetic poles.

In the foregoing twelfth aspect, the damping device according to the thirteenth aspect, provides the damping magnet in movable fashion in the direction along the transportation line, and a repulsing magnet is fixedly arranged in opposition to the back of the damping magnet in spaced apart relationship, which damping magnet and repulsing magnet are provided with the same polarities at the mutually opposing magnetic poles.

According to the fourteenth aspect of the invention, in the twelfth aspect of the invention, a flooring fixing magnet is provided on the bottom of the article and the transportation line is provided with a magnetic body extending in the transporting direction.

According to the fifteenth aspect of the invention, in the thirteenth aspect of the invention, a flooring fixing magnet is provided on the bottom of the article and the transportation line is provided with a magnetic body extending in the transporting direction.

According to the sixteenth aspect of the invention, a damping device for damping collision between articles transported along a transportation line, comprises:

a damping magnet projecting from the outer periphery of the article and being movable in an retracting direction;
   a repulsing magnet arranged in opposition to the back of the damping magnet in a spaced apart relationship; and
   the damping magnet and the repulsing magnet being provided with the same polarities at the mutually opposing magnetic poles.

With the foregoing twelfth aspect of the invention, the following effects can be attained:

① When adjacent articles approach each other to collide, direct collision can be avoided by mutually magnetic repulsing of the damping magnets. Therefore, collision noise or friction noise associated with the collision of the articles will never been created.

② Since the damping device will never collide with the counterpart article, wearing is hardly caused to expand the lift thereof.

According to the thirteenth aspect of the invention, the following effect can be obtained in addition to the foregoing ① and ②.

③ The damping magnet of the damping device is elastically supported at the back by the repulsive force generated between the damping magnet and the repulsing magnet so that the retracting motion of the damping magnet due to collision energy can be successfully damped to provide enhanced damping performance.

According to the fourteenth and fifteenth aspects of the invention, the following effect can be obtained in addition to the foregoing ① to ③.

④ In the foregoing effect of ①, the magnetic repulsive force between the damping magnets of the adjacent articles tends to cause uncontrolled behavior of the adjacent articles in floating fashion. In such case, the floor fixing magnet generates the magnetic drawing force with the magnetic body of the transportation line to prevent the articles from causing the uncontrolled behavior.

With the foregoing sixteenth aspect of the invention, the following effect can be obtained.

⑤ With the shown construction, the damping device can damp collision energy upon collision with other article or the facility since the damping magnet is elastically supported at the back with the repulsive force generated between the damping magnet and the repulsing magnet, which repulsive force restricts inward movement of the damping magnet for damping the collision energy. Therefore, the shown embodiment of the damping device can be effective for damping collisions irrespective whether the counterpart has a similar damping device or not. Since the shown embodiments produces the damping force with the magnetic repulsive force, it may not cause wearing or fatigue of elasticity as those occurring in the mechanical damping means, such as rubber, and thus can expand the lift.

BRIEF DESCRIPTION OF THE DRAWINGS

The present invention will be understood more fully from the detailed description given herebelow and from the accompanying drawings of the preferred embodiments of the invention, which, however, should not be taken to be limitative to the invention but art for explanation and understanding only.

In the drawings:

FIGS. 13(A) and 13(B) are illustration of a still further embodiment of the article fixing and damping device according to the invention;

DESCRIPTION OF THE PREFERRED EMBODIMENT (A) Article Holder

Figure 1:
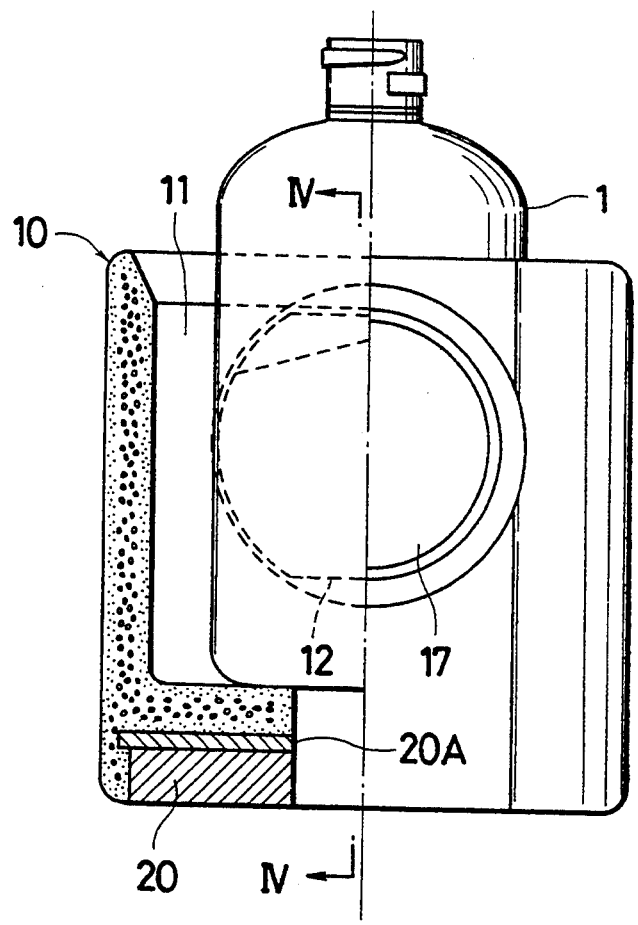
FIG. 1 is a front elevation of one embodiment of an article holder according to the present invention.
Figure 2:
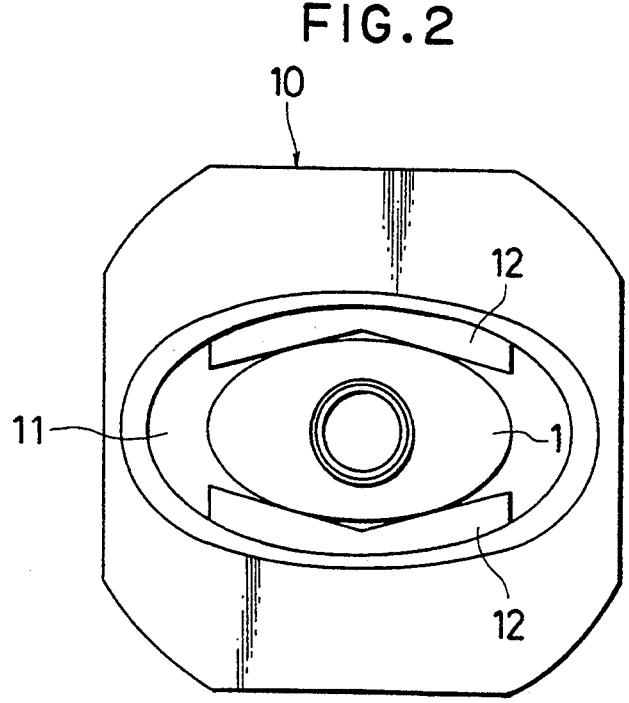
FIG. 2 is a plan view of the article holder of FIG. 1.
Figure 3:
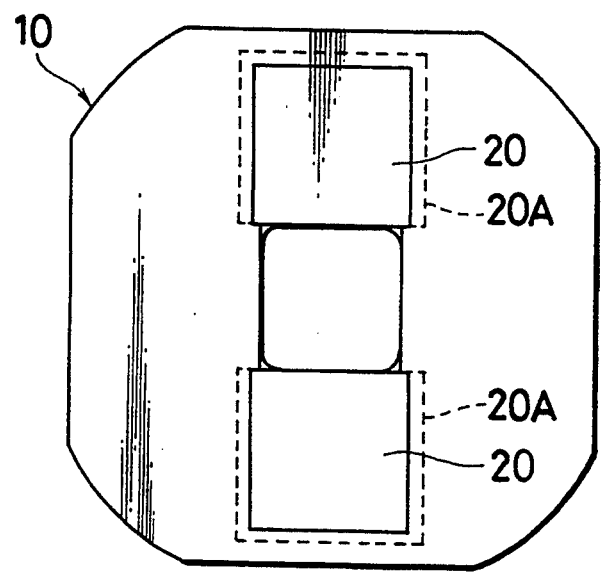
FIG. 3 is a bottom view of the article holder of FIG. 1.
Figure 4:
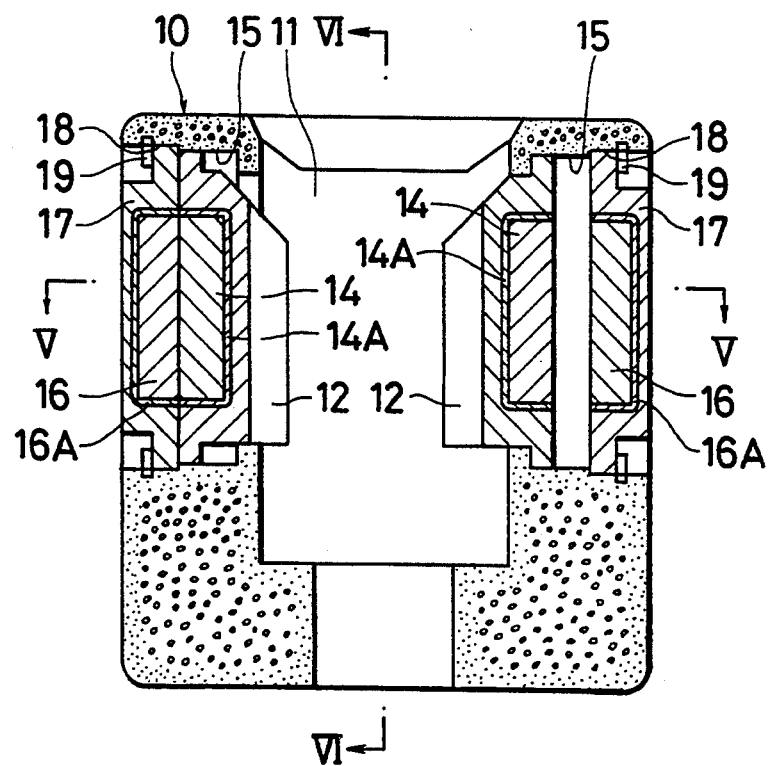
FIG. 4 is a section taken along line IV—IV of FIG. 1.
Figure 5:
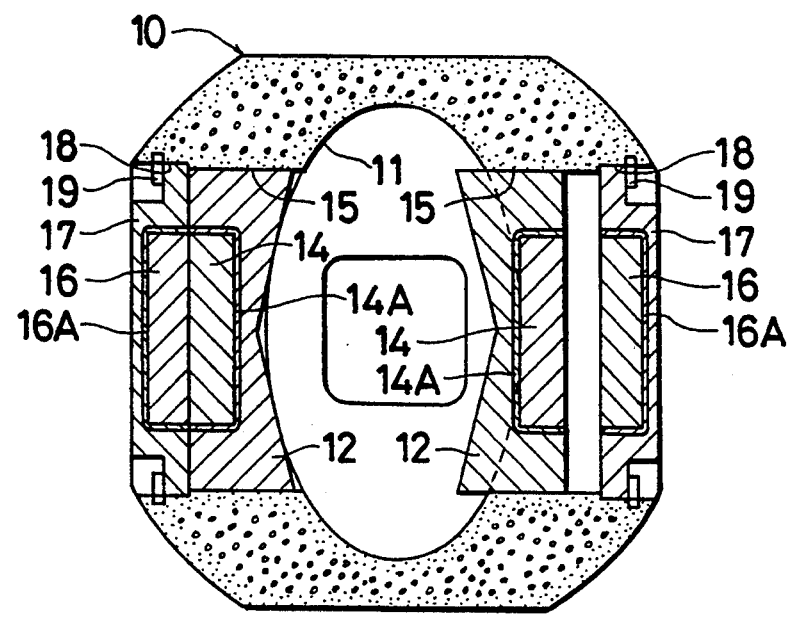
FIG. 5 is a section taken along line V—V of FIG. 4.
Figure 6:
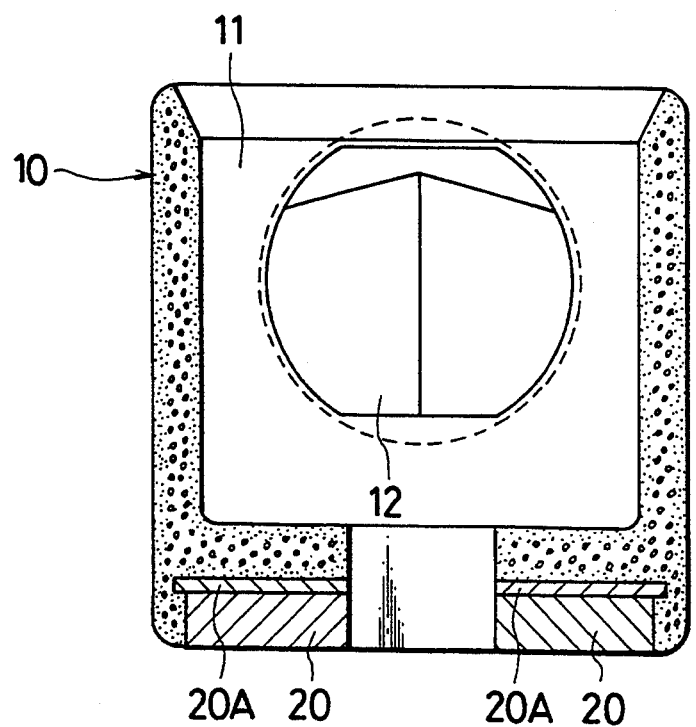
FIG. 6 is a section taken along line VI—VI of FIG. 4.
Figure 7:
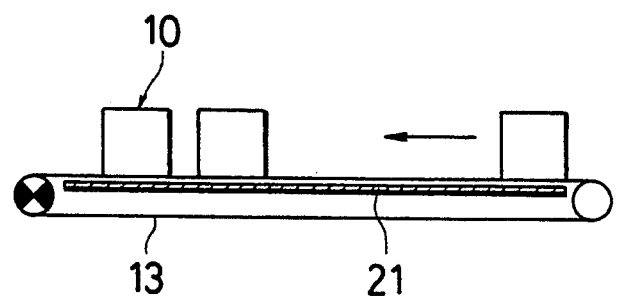
FIG. 7 is a diagrammatic illustration showing a transporting line for the article holder.

As shown in FIGS. 1~6, the preferred embodiment of an article holder 10, according to the present invention, is designed to hold an article 1 set in an article holding portion 11 by grasping the article 1 with a pair of article holding members 12 arranged at front and back sides thereof. A plurality of article holders 10 are sequentially transported through a transportation line formed with a transporting conveyer 13 (FIG. 7). For example, the article 1 can be a sectionally elliptic detergent container which is filled with a detergent and capped while it is held by the article holder 10 and transported through the transportation line.

The article holding members 12 are formed of an elastic body, such as rubber, nylon, hard urethane or so forth or a low friction body, such as a Teflon (tradename). First magnets 14 (FIG. 4) are arranged at the back sides of respective of the article holding members 12. The first magnets 14 and the article holding members 12 are received within guide holes 15 to be supported within an article holder body of the article holder 10 in a movable fashion for movement in a direction for holding the article.

On the other hand, the article holder 10 is further provided with second magnets 16 arranged in opposition to respective of the first magnets 14. The second magnets 16 are secured to the article holder body 10A by means of mounting blocks 17. The mounting blocks 17 for the second magnets 16 are disposed in mounting holes 18 and fixed therein by means of fixing members 19. The adjacent first and second magnets 14 and 16 are arranged with the same opposing poles (e.g. N pole) to each other. The peripheries of the first magnets 14 except for the surfaces mating with the second magnets 16 are covered with yokes 14A formed of thin steel strips or so forth and fixed to the article holding members 12. On the other hand, the peripheries of the second magnets 16 except for the surfaces mating with the first magnets 14 are covered with yokes 16A formed of thin steel strips and fixed to the mounting blocks 17.

As set forth, the pair of article holding members 12 are arranged at the front and back sides. Therefore, the pair of article holding members 12 are opposed to each other across the article holding portion 11.

Magnets 20 (FIG. 1) for securing the article holders 10 on the floor of a transporting conveyer 13 (FIG. 7) are built-in the bottom of the article holder body. On the other hand, a magnetic body 21 (FIG. 7) is arranged on the underside of the transporting conveyer 13 and extended in the transporting direction (see FIG. 7). By this arrangement, the magnets 20 on the article holder 10 generate a magnetic drawing force between the magnetic body 21 of the transportation conveyor so that the article holder 10 can be stably transported along a predetermined transporting path. It should be noted that the magnets 20 are covered at the inner side peripheries adjacent the article holding portion 11 with a thin steel strip 20A and built-in the article holder body.

Figure 9A:
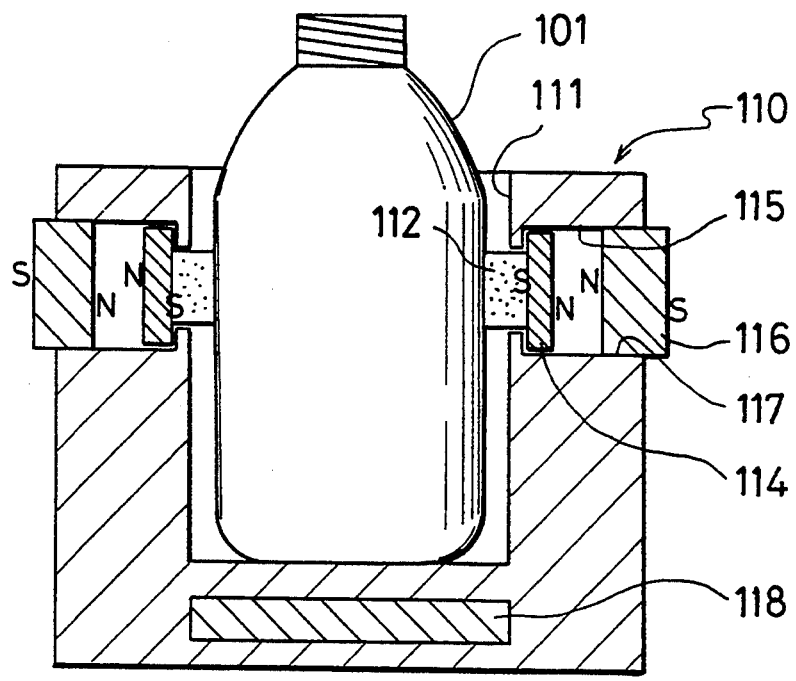
FIGS. 9(A) and 9(B) are schematic illustration of one embodiment of an article fixing and damping device according to the present invention.
Figure 9B:
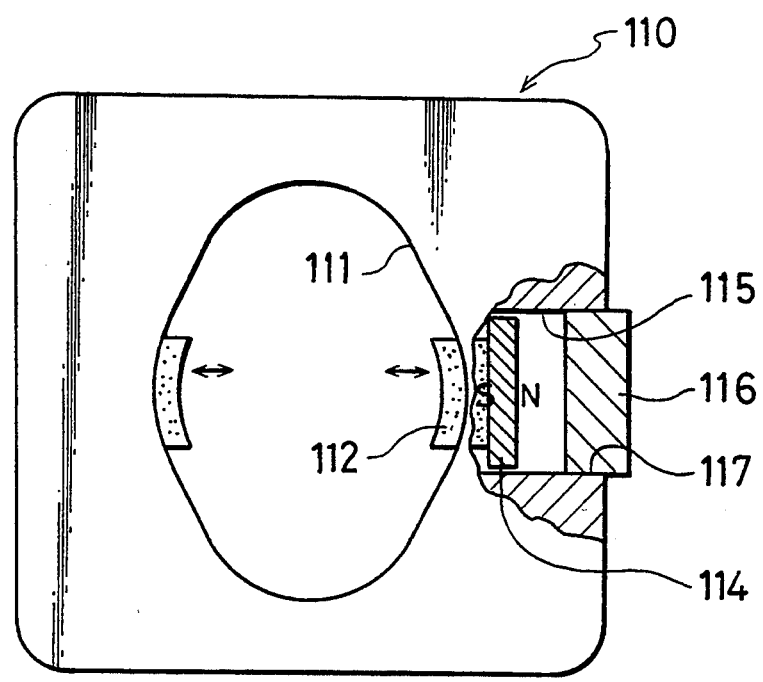

It should be noted that it may be possible to extend the second magnets 16 (FIG. 4) beyond the thickness of the mounting block 17 (see FIG. 9B) so that the magnetic pole (e.g. S pole) remote from the associated first magnets 14 is exposed through the outer periphery of the article holder body. With this arrangement, when a plurality of the article holders 10 are transported through the transportation line in sequence white aligning the article holders 10 in series, the second magnets 16 are exposed from the mutually mating front and rear end surfaces so as to oppose the same magnetic poles (e.g. S pole) thereof. While the article holders 10 are sequentially transported through the transportation line, a repulsive magnetic field is formed between the opposing second magnets 16 of the adjacent article holders 10 so as to prevent the adjacent article holders 10 from directly colliding with each other. Thus, the collision between the adjacent article holders 10 can be successfully damped.

The article holder 10 is formed of a urethane type foamed body and having the density at the outer skin portion higher than that at the core portion. Here, the density of the outer skin portion of the article holder 10 is preferred to be 1.5 to 2.0 times higher than that of the core portion. When the density at the outer skin portion is higher than that of the core portion in the extent less than 1.5 times of the later, the foaming degree at the outer skin portion becomes excessive to degrade lubrication relative to the transporting surface of the transportation line, or to possibly permit penetration of the water, detergent or so forth. On the other hand, when the density at the outer skin portion is higher than that of the core portion in the extent higher than 2.0 times, a tendency of cracking during formation is increased and damping ability can be degraded.

As the urethane foamed body, either of a hard urethane foam, a soft urethane foam, a semi-hard urethane foam, an integral skin foam (tradename) or so forth, can be employed.

Figure 8:
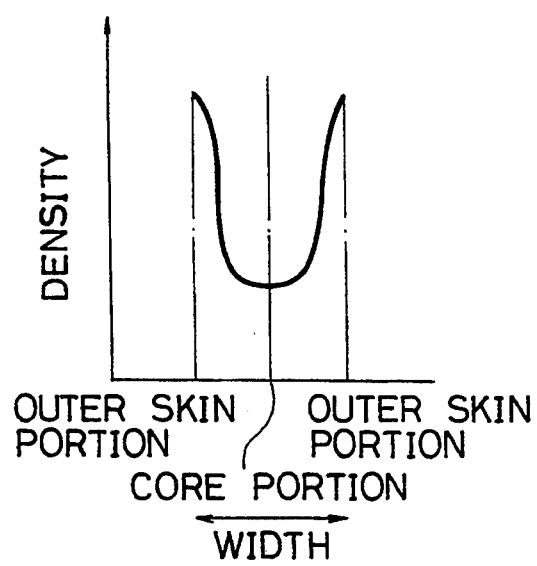
FIG. 8 is a chart showing a density distribution of urethane type formed body employed in the present invention.

It should be noted that, in the preferred embodiment, the article holder body 10 may be formed of a polyurethane integral skin foam which is a molded article of a polyurethane foam, in which a core portion and an outer skin portion are sequentially and integrally formed of the same polyurethane through one injection foaming process. The article holder 10 formed of the polyurethane integral skin foam varies the density distribution from the outer skin portion to the core portion so that the density becomes maximum at the outer skin portion and is reduced in parabolic characteristics to reach a minimum at the core portion, as illustrated in FIG. 8. Formation of the outer skin portion is affected by an interaction of a mold temperature and a foaming pressure. The polyurethane integral skin foam can be classified into a soft integral foam and a hard integral foam depending upon degree of opening of cells.

The process for forming the article holder 10 of the polyurethane integral skin foam is performed through the following steps, for example:

(1) temperature adjustment of mold (40°~50° C.), cleaning, application of a separating agent (wax type), sweeping of the separating agent;

(2) application of mold coat on the mold (surface coating is applied for the article holder 10 in conjunction with molding), drying;

(3) setting of inserts (the magnet 20, the york 20A and so forth) within the mold;

(4) injection of urethane into the mold, clamping of an upper mold, foam curing, opening of the upper mold, releasing from mold, (5) primary inspection; and (6) completion of the article through flash processing or so forth.

The properties of polyurethane integral skin foams are as shown in the following table 1. It should be noted, in the table 1, SKL-1019, SKL-3001, EC-5376, SKL3001-4 are tradename of Polyurethane Kasei K. K.

TABLE 1

|  | SKL-1019 | SKL-3001 | SKL-3001-4 | EC-5376 |
| --- | --- | --- | --- | --- |
| Skin Density | 0.1 ~ 0.5 | 0.2 ~ 0.5 | — | 0.5 ~ 0.8 |
| Core Density | 0.6 ~ 0.9 | 0.7 ~ 0.9 | — | 0.8 ~ 1.0 |
| Tension | 27.78 | 13.07 | 16.1 | — |
| Expansion | 117 | 120 | 117 | — |
| Shearing | 9.54 | 5.0 | 6.3 | — |
| Shore A | 77.2 | 50 | 60 | — |

Discussion for the effects of the shown embodiment will be given herebelow.

① Since the article holder 10 is formed of the urethane type foamed body and provided with a higher density at the outer skin portion than that of the core portion, the outer skin portion becomes hard enough to improve durability. Also, the core portion has a higher foaming degree, a shock absorbing ability or damping ability can be improved with reducing of the weight. Furthermore, even when the article holder 10 is washed by water, detergent or so forth, penetration of the water, detergent or so forth can be successfully prevented by the high density outer skin portion. This contributes for maintaining accuracy of checking weight of the article 1 held in the article holding portion 11.

② By providing the magnetic body (magnet 20) in the bottom of the article holder 10, the magnetic body on the article holder 10 can be drawn to the magnetic drawing means (magnetic body 21) provided in the conveyer 13, for example, to form a line in the article transporting line, a storage line or so forth, to maintaining the stable attitude of the article during transportation and storage.

③ When the article 1 is inserted in the article holding portion 11 of the article holder 10, the article 1 is pushed into the article holding portion 11 with a force overcoming the magnetic repulsive force generated between the opposing same poles (e.g. N poles) of the first magnet 14 and the second magnet 16 so that each article holding member 12 is forced into the article holder 10. When the article 1 is inserted in the article holding portion 11, the article holding members 12 are pressed onto the article 1 by the magnetic repulsive forces between the first and second magnets 14 and 16 for firmly holding the article 1.

④ Since the depression force for pressing the article holding members 12 against the article 1 for grasping the latter is generated by the magnetic repulsive force which can be maintained semi-permanently, the frequency of maintenance can be reduced.

⑤ The shifting stroke against the magnetic repulsive force exerted on the article holding members 12 can be set at a substantial length. Accordingly, it becomes possible to accommodate the variation of size and configuration of the article 1 within the range of stroke of the article holding members 12. Also, by the article holding members 12, an appropriate depression force can be exerted for maintaining an appropriate holding condition irrespective of the difference of the configuration and/or size of the article 1 set in the article holding portion 11. Therefore, good adaptivity for variation of the size and configuration of the article 1 can be attained.

⑥ Since the pair of article holding members 12 are opposed across the article holding portion 11 and are biased by substantially equal magnitudes of the magnetic repulsive force to grasp the article 1 therebetween, the article 1 can be successfully centered within the article holding portion 11 irrespective of the configuration and size thereof.

It should be noted that, in the shown embodiment, the article holder body is formed of the polyurethane integral skin foam with an overall average density of $0.6 \sim 0.9$ (d/cm$^3$), a ratio of skin portion density versus core portion density of $1.5 \sim 2$, and the thickness of the skin portion of 2 mm. As a result, $70 \sim 80$ of hardness (rubber hardness C scale) can be obtained at the outer skin portion.

(B) Article Fixing Device and Article Damping Device (First Embodiment) (see FIGS. 9 and 10)

Figure 10A:
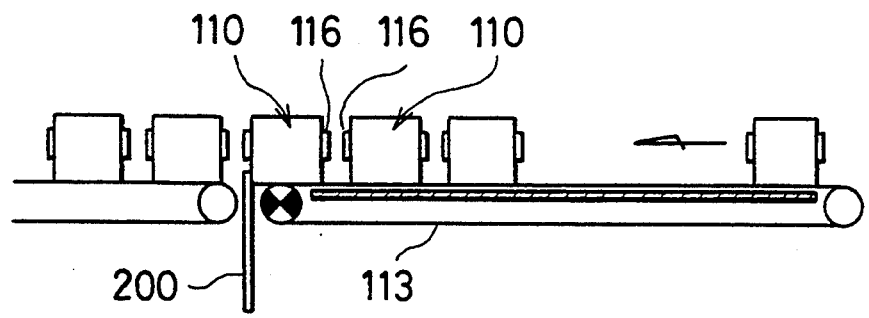
FIGS. 10(A), 10(B) and 10(C) are schematic illustration showing practical use condition.
Figure 10B:
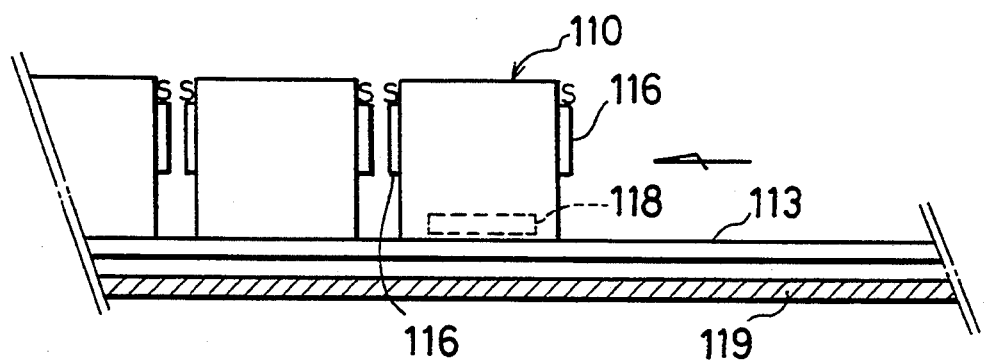
Figure 10C:
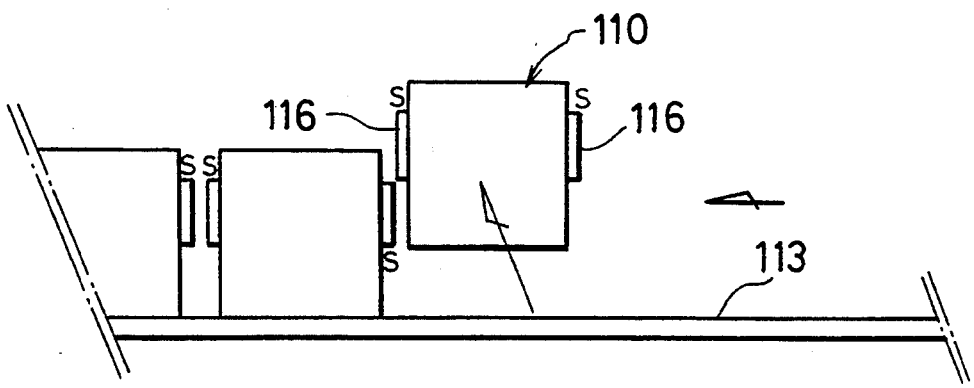

An article holder 110 (FIGS. 9A, 9B, 10A, 10B and 10C) is designed to hold an article 101 set in an article holding portion 111 by grasping the article 101 with a pair of article holding members 112 arranged at front and back sides thereof. A plurality of article holders 110 are sequentially transported through a transportation line formed with a transporting conveyer 113 (FIGS. 10A, 10B and 10C). For example, the article 101 can be a sectionally elliptic detergent container which is filled with a detergent and capped while it is held by the article holder 110 and transported through the transportation line.

The article holding members 112 are formed of an elastic body, such as rubber or so forth or a low friction body, such as a Teflon (tradename). First magnets 114 are arranged at the back sides of respective of the article holding members 112. The first magnets 114 and the article holding members 112 are received within guide holes 115 to be supported within an article holder body of the article holder 110 in a movable fashion for movement in a direction for holding the article.

On the other hand, the article holder 110 is further provided with second magnets 116 arranged in opposition to respective of the first magnets 114. The second magnets 116 are secured to the article holder body by pressing into mounting holes 117. The adjacent first and second magnets 114 and 116 are arranged with opposing poles (e.g. N pole) facing each other.

As set forth, the pair of article holding members 112 are arranged at the front and back sides. Therefore, the pair of article holding members 112 are opposed to each other across the article holding portion 111 of the article holder 110.

The magnetic poles (e.g. S poles) of the second magnets 116 which are positioned remote from the first magnets 114 are exposed through the outer periphery of the article holder body. With this arrangement, when a plurality of the article holders 110 are transported through the transportation line in sequence with aligning the article holders 110 in series, the second magnets 116 are exposed from the mutually mating front and rear end surfaces so as to oppose the same magnetic poles (e.g. S pole) thereof. While the article holders 110 are sequentially transported through the transportation line, a repulsive magnetic field is formed between the opposing second magnets 116 of the adjacent article holders 110 so as to prevent the adjacent article holders 110 from directly colliding with each other.

Next, effects of the shown embodiment will be discussed.

① When the article 101 is set in the article holding portion 111 of the article holder 110, the article holding members 112 are pushed into the article holder 101 with a force of pushing the aricle 101 into the article holding portion 111 and overcoming the magnetic repulsive force generated between the opposing same poles (e.g. N poles) of the first magnet 114 and the second magnet 116 so that the article 101 can be firmly held in the article holder 110.

② Since the depression force for depressing the article holding members 112 onto the article 101 for grasping the latter is generated by the magnetic repulsive force which can be maintained semi-permanently, the frequency of maintenance can be reduced.

③ The shifting stroke against the magnetic repulsive force exerted on the article holding members 112 can be set at a substantial length. Accordingly, it becomes possible to accommodate the variation of size and configuration of the article 101 within the range of stroke of the article holding members 112. Also, by the article holding members 112, an appropriate depression force can be exerted for maintaining an appropriate holding condition irrespective of the difference of the configuration and size of the article 101 to be set in the artice holding portion 111. Therefore, good adaptivity for variation of the size and configuration of the article 101 can be attained.

④ Since the pair of article holding members 112 are opposed across the article holding portion 111 and are biased by substantially equal magnitudes of the magnetic repulsive force to grasp the article 101 therebetween, the article 101 can be successfully centered within the article holding portion 111 irrespective of the configuration and size thereof.

⑤ When the adjacent article holders 110 are sequentially transported through the transportation line, the adjacent articles 110 are prevented from direct collision with each other by the magnetic repulsive force generated between the second magnets 116 exposed to the outer peripheries. Accordingly, the article holders 110 are successfully damped.

It should be noted that floor fixing magnets 118 are built into the bottom of the article holder 110 and a magnetic body 119 is provided beneath the transporting conveyer 113 to extend in the transporting direction. By this, according to the shown embodiment, when the adjacent article holders 110 approaches to collide, the magnetic repulsive force is generated between the opposing second magnets of the adjacent article holders 110. Then, it is possible to cause uncontrolled floating behavior of the adjacent articles in any direction. At this time, the floor fixing magnets 118 of the article holder 110 generate the magnetic drawing force with the magnetic body 119 of the transportation line to stabilize the article holders 110 without causing uncontrolled behavior (see FIGS. 10(B) and 10(C))

On the other hand, in the article holder 110, when the adjacent article holders 110 approach to collide, a given clearance between the adjacent article holders 110 can always maintained. Therefore, it becomes possible to stopping operation with a stopper 200 moving upper and lower levels with respect to the transporting level of the transporting conveyer 113.

Figure 11:
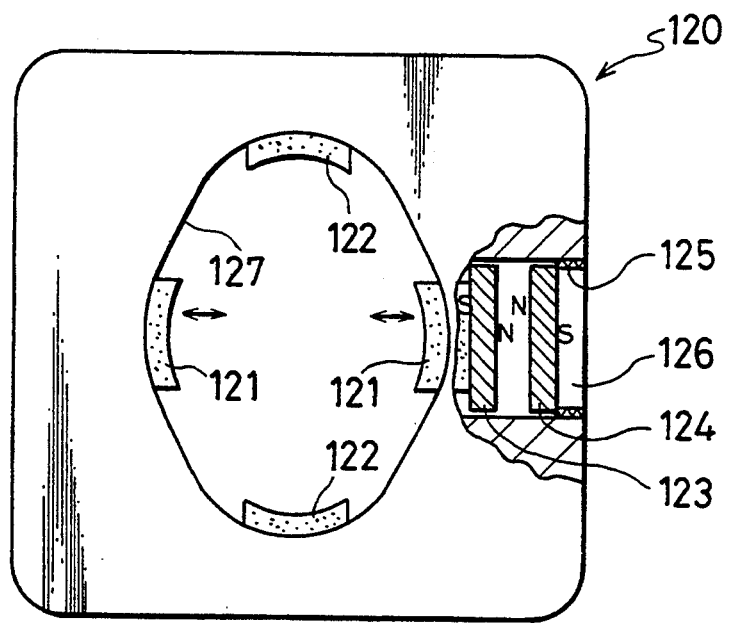
FIG. 11 is a schematic illustration showing another embodiment of the article fixing and damping device according to the invention.

(Second Embodiment) (see FIG. 11)

An article holder 120 is differentiated from the above-mentioned article holder 110 in that another pair of article holding members 122 are provided at left and right sides in addition to article holding members 121 arranged at front and back sides.

The article holder 120 has first magnets 123 and second magnets 124 corresponding to the article holding members 121 in the similar manner to those of the first magnets 114 and the second magnets 116 of the article holder 110. Also, the article holding members 122 are provided with first magnets (not shown) and second magnets (not shown).

The second magnets 124 are coupled with plugs 126 threadingly engaged with mounting holes 125 formed in an article holder 120.

In the shown embodiment, the article holding members 121 arranged at front and back sides and the article holding members 122 arranged at the left and right sides can center the article 101 within an article holding portion 127 in the back and forth direction and the lateral direction.

Figure 12:
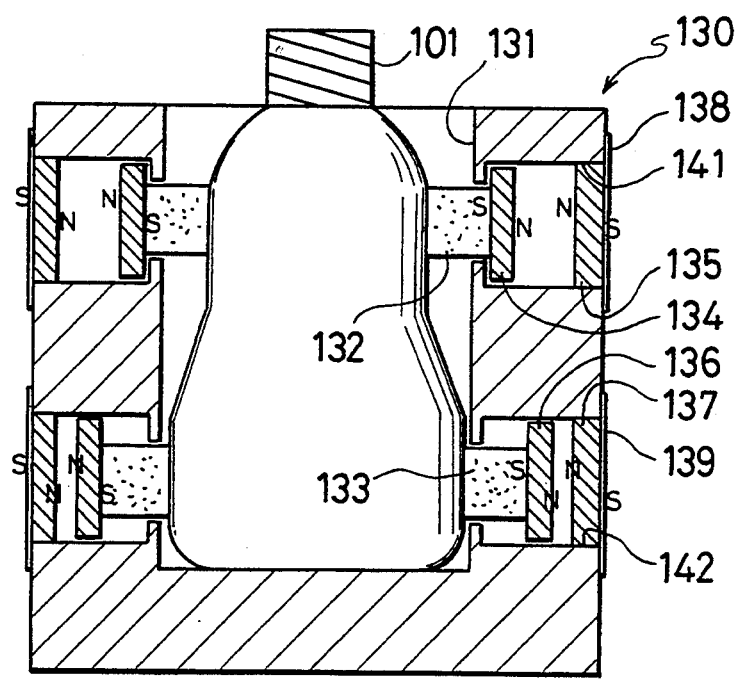
FIG. 12 is a schematic illustration showing a further embodiment of the article fixing and damping device according to the invention.

(Third Embodiment) (see FIG. 12)

An article holder 130 is differentiated from the above-mentioned article holder 110 in that an upper pair of the article holding members 132 arranged in the front and back sides and a lower pair of article holding members 133 arranged in the front and back sides are provided in upper and lower positions in an article holding portion 131.

The article holder 130 includes first magnets 134 and second magnets 135 in the upper pair of the article holding members 132 and first magnets 136 and second magnets 137 in the lower pair of the article holding members 133. Respective of the first magnets 134 and 136 and the second magnets 135 and 137 are similar to those of the first magnets 114 and the second magnets 116 of the article holder 110.

It should be appreciated that the second magnets 135 and 137 are coupled with steel plates 138 and 139. The second magnets 135 and 137 are set in mounting holes 141 and 142 formed in the article holder 130 in a position where the steel plates 138 and 139 are fixed onto the outer periphery of the article holder 130.

According to the shown embodiment, by the presence of the upper pair of the article holding members 132 arranged in the front and back sides and the lower pair of the article holding members 133 arranged in the front and back sides, the article 101 can be certainly maintained within the article holding portion 131 in the stable position.

It should be noted that, in the preferred embodiments of the invention, the article holding members 112, 121, 122,132 and 133 may be formed in a form, in which only the surface layer is formed of the elastic body, such as rubber or the low friction body, such as Teflon (tradename).

Figure 14A:
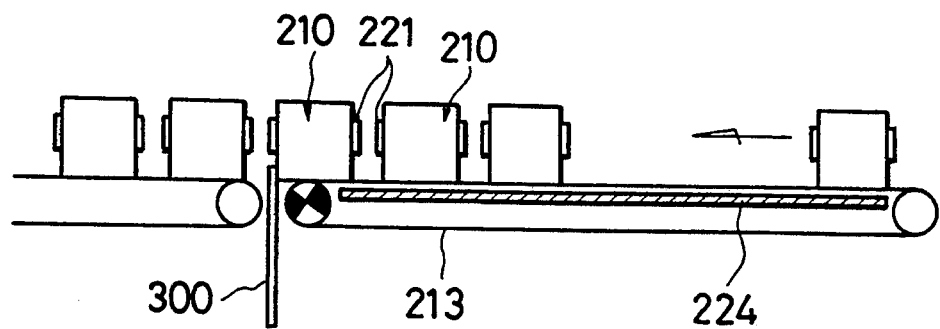
FIGS. 14(A), 14(B) and 14(C) are illustration showing condition of practical use of the article fixing and damping device of FIG. 13.
Figure 14B:
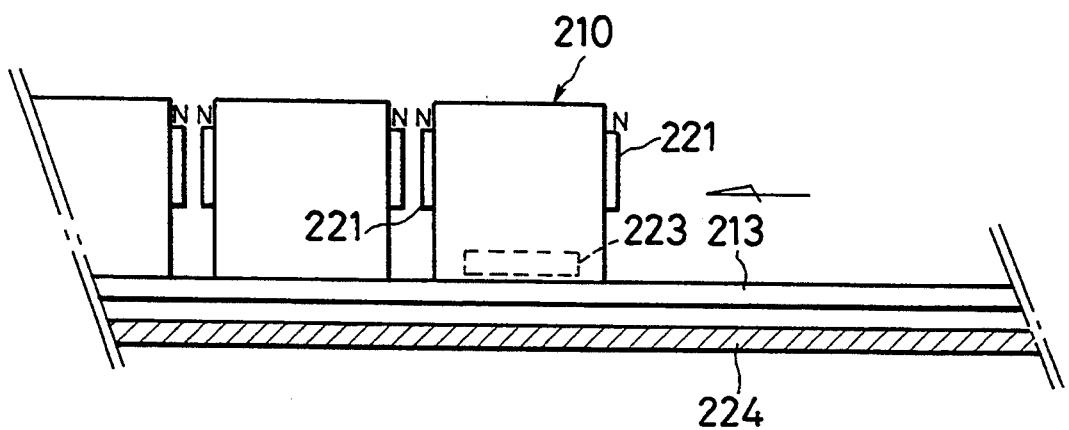
Figure 14C:
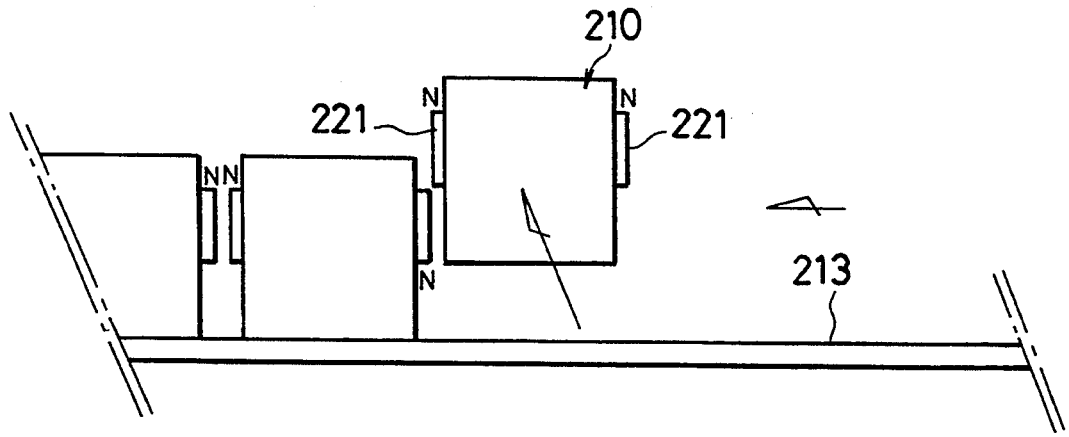

(Fourth Embodiment) (see FIGS. 13-15)

An article holder 210 is designed to hold an article 201 set in an article holding portion 211 by grasping the article 201 with a pair of article holding members 212 arranged at front and back sides thereof. A plurality of article holders 210 are sequentially transported through a transportation line formed with a transporting conveyer 213. For example, the article 201 can be a sectionally elliptic detergent container which is filled with a detergent and capped while it is held by the article holder 210 and transported through the transportation line.

The article holding members 212 are formed of an elastic body, such as rubber and are movable between article holding positions and article releasing positions relative to an article holding portion 211 of the article holder 210.

First magnets 214 are arranged at the back sides of each of the article holding members 212. The article holding members 212 are received within guide holes 215 to be supported within an article holder body of the article holder 210 in a movable fashion for movement between the article holding positions and the article releasing positions.

On the other hand, the article holder 210 is further provided with second magnets 216 in opposition to respective of the first magnets 214. The adjacent first and second magnets 214 and 216 are arranged with opposing poles (e.g. N pole) facing each other.

On the other hand, switching levers 217 are disposed for movement across a space defined between the first and second magnets 214 and 216. The switching levers 217 are formed of a magnetic body and pivotable about pivots 218. In the shown embodiment, the switching lever 217 is formed of the magnetic body, such as an iron plate.

With the shown construction, when the switching lever 217 is placed between the first and second magnets 214 and 216, by the magnetic drawing force acting between the first magnets 214 and the switching levers 217, the article holding members 212 are retracted inside of guide holes 215 to be set at the article releasing positions. Accordingly, at this position, the article 201 can be freely set and removed from the article holding portion 211 of the article holder 210.

On the other hand, when the switching lever 217 is switched away from the space between the first magnets 214 and the second magnets 216, the article holding members 212 are projected outside of the guide holes 215 by the magnetic repulsive force generated between the first magnets 214 and the second magnets 216 and thus placed at the article holding position. Accordingly, at this condition, the article 201 in the article holding portion 211 can be grasped and held by the pair of the article holding members 212 arranged at the front and back sides.

With the shown embodiment, when the article 201 is set in the article holding portion 211, the article holding members 212 can be placed at the article releasing position so as not to cause frictional contact. Therefore, scratching will never been caused on the article 201. Also, wearing of the article holding member 212 is hardly caused. Furthermore, the article 201 set in the article holding portion 211 can be appropriately depressed by the article holding members 212 subsequently switched into the article holding position. Accordingly, the article 201 can be firmly held without forming scratches. Also, the article holder of the shown embodiment requires less frequent maintenance.

On the other hand, according to the present invention, since the stroke motion between the article holding position and the article releasing position of the article holding member 212 can be set sufficiently large, it can accommodate variations of the configuration and/or size of the article 201. Furthermore, the article 201 set in the article holding portion 211 can be subjected to an appropriate depression force via the article holding members 212 switched at the article holding position, and thus appropriately held therein irrespective of the configuration and/or size of the article 201. Therefore, the present invention can provide high adaptivity for variations of the configuration and/or size of the article 201.

Furthermore, in the shown embodiment of the article holder 210, a damping device 220 having the construction as set out below is provided for avoiding direct collision of the adjacent article holders when the article holders 201 are transported through the transportation line in series.

The article holders 210 are provided with damping magnets 221 at the portions mating with the corresponding portions of the adjacent article holders 210, i.e. the front and back side outer surfaces of the article holder 210. Mutually adjacent article holders 210 are provided the damping magnets 221 opposing the same magnetic poles (e.g. N poles).

On the other hand, the damping magnets 221 are disposed within guide holes 222 in movable fashion for movement along the transportation line. The back side of the damping magnets 221 are opposed to the second magnets 216 which are fixedly provided at the bottom portion of the guide holes 222 and serve as repulsing magnets, in spaced apart relationship. The damping magnets 221 and the second magnets 216 have the mutually opposing magnetic poles having the same polarities (e.g. S poles).

With the shown embodiment, the mutually adjacent article holders 210 are damped from direct collision by the magnetic repulsive force generated between the opposing damping magnets 221. Accordingly, the collision noise, the friction noise or so forth which may be otherwise caused by collision of the article holders 210 will be hardly caused.

In addition, according to the shown embodiment, since collision of the damping device 220 with the counterpart article holder 210 is hardly caused, substantially no wearing will be caused on the article holder 210 so that the life thereof can be successfully expanded.

According to the shown embodiment, since the second magnets 216 are arranged at the back sides of the damping magnets 221 of the article holder 210, motion of the damping magnets 221 toward the retracted position can be successfully restricted by the magnetic repulsive forth generated between the damping magnet 221 and the second magnet 216 for providing enhanced damping effect.

Furthermore, fixing magnets 223 are built into the bottom portion of the article holder 210. On the other hand, a magnetic body 224 is provided beneath the transportation conveyer 213 and extended in the transporting direction.

With the shown embodiment, in the occasion, in which the collision of the adjacent article holders 210 can be caused otherwise, the magnetic repulsive force is generated between the mutually opposing damping magnets 221 to possibly cause uncontrolled movement of the article holders 210 in random directions. However, the fixing magnets 223 of the article holders 210 generate magnetic drawing force between the magnetic body 224 of the transportation line to restrict uncontrolled movement of the article holders 210 and thus stably maintain them in place (see FIGS. 14(B) and 14(C)).

Since the article holders 201 according to the shown embodiment, can maintain a given distance between the adjacent article holders 210 even when they approach each other to collide, it becomes possible to provide a stopper 300 which moves up and down of the transportation level of the transporting conveyer 213 for providing stopping operation.

Discussion for the results of implementation of the above-mentioned damping device 220 will be given herebelow.

In the implementation, good results were obtained when 5 mm of spaces were provided between each of the second magnets 216 and the damping magnets 221, 7 mm of clearance were provided between each of the fixing magnets 223 and the magnetic body 224, 3000~800 G of magnetic force was provided for each of the second magnets 216, 3000~800 G of magnetic force was provided for each of the damping magnets 221, 3000~800 G of magnetic force was provided for each of the fixing magnets 223, the total weight of the article holder 210 and the article 201 was 1500~700g, the belt speed of the transporting conveyer 213 was 100~40 m/min., and the friction coefficient of the belt of the transporting conveyer was 0.9~0.3. It was found that a preferable result could be obtained when 2000~1000 G of magnetic force was provided for each of the second magnets 216, 2000~1000 G of magnetic force was provided for each of the damping magnets 221, 2000~1000 G of magnetic force was provided for each of the fixing magnets 223, the total weight of the article holder 210 and the article 201 was 1200~800 g, a belt speed of the transporting conveyer 213 was 80~50 m/min., and the friction coefficient of the belt of the transporting conveyer was 0.8~0.4. Further preferred results could be obtained when 1500~1200 G of magnetic force was provided for each of the second magnets 216, 1500~1200 G of magnetic force was provided for each of the damping magnets 221, 1500~1200 G of magnetic force was provided for each of the fixing magnets 223, the total weight of the article holder 210 and the article 201 was 1100~900 g, the belt speed of the transporting conveyer 213 was 70~60 m/min., and the friction coefficient of the belt of the transporting conveyer was 0.7~0.5.

Figure 15A:
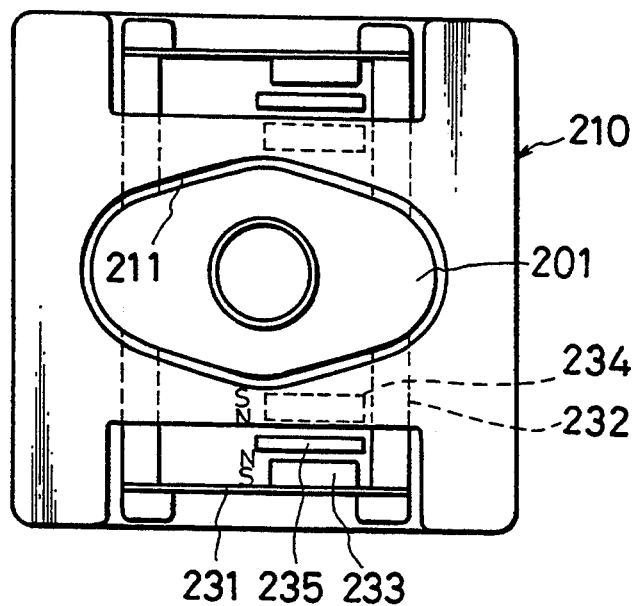
FIGS. 15(A) and 15(B) are illustration showing modification of the article fixing and damping device of the invention.
Figure 15B:
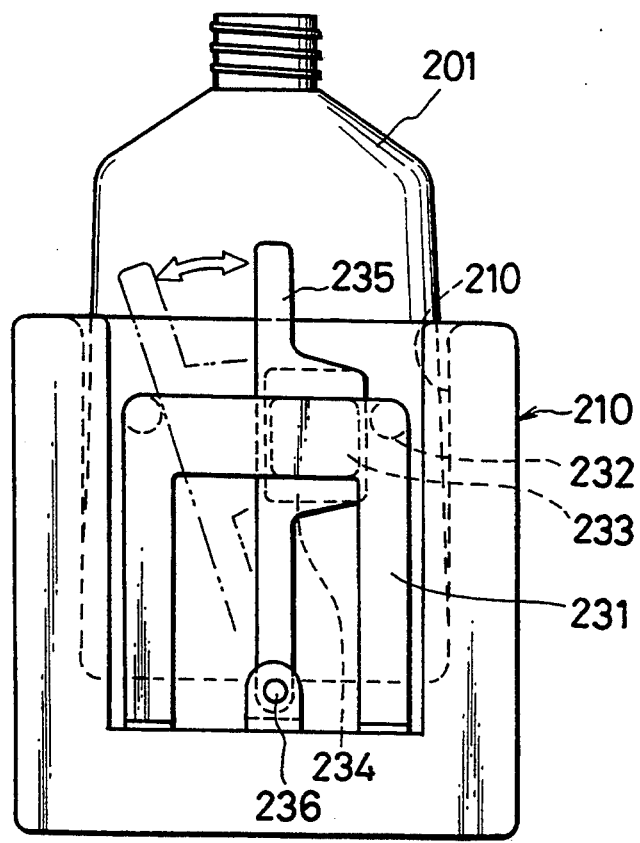

The modification illustrated in FIGS. 15A and 15B is differentiated from the foregoing embodiment in the points set out below.

Front and back side leaf springs 231 are provided in upright fashion at the front and back sides in opposition to each other across the article holding portion 211 of the article holder 210. Article holding members 232 are provided at both sides of the upper portion of each leaf spring 231. Also, a first magnet 233 is provided in the vicinity of the center of the upper portion of each leaf spring 231. Second magnets 234 are provided in the article holder 210 in opposition to respective of the first magnets 233. Respective magnets 233 and 234 are provided the same magnetic poles (e.g. N poles) at the mutually opposing poles. Switching levers 235 are provided for pivotal movement about pivots 236 across spaces defined between the magnets 233 and 234.

Accordingly, with the shown modification, while the switching lever 235 is placed in the space between the magnets 233 and 234, the article holding members 232 are placed at the article releasing position by the magnetic drawing force acting between the first magnets 233 and the switching levers 235. Accordingly, at this position, the article 201 can be freely set into and removed from the article holding portion 211 of the article holder 210.

When the switching levers 235 are pivoted away from the spaces between the first and second magnets 233 and 234, the article holding members 232 are placed at the article holding positions by the repulsive force generated between the first magnets 233 and the second magnets 234. Accordingly, at this condition, the article 201 in the article holding portion 211 can be grasped and held therein by the front and back side article holding members 232.

It should be noted that, in the shown embodiment, the magnets 214, 216, 221, 223, 224, 233 and 234 can be either permanent magnets or electromagnets.

(Fifth Embodiment) (see FIG. 16)

The fifth embodiment is differentiated from the fourth embodiment at the following points.

In the fifth embodiment, first magnets 241 fixed to the article holding members 212 and second magnets 242 fixed to the article holder 210 and arranged in opposition to the first magnets 241 are provided. Switching levers 243 are provided in movable fashion for movement into and out of positions opposing to the first magnets 241 between the first and second magnets 241 and 242. Third magnets 244 are provided on the switching levers 243. The opposing poles of the first and second magnets 241 and 242 are provided with opposite magnetic poles (i.e. N and S poles). On the other hand, the opposing poles of the first magnets 241 and the third magnets 244 are provided with the same magnetic poles (e.g. N poles) to the opposing pole of the first magnets 241.

By this arrangement, when the switching levers 243 are placed in the position out of the position to oppose with the first magnets 241, the article holding members 212 are placed at the article releasing position by the magnetic drawing force acting between the first magnets 241 and the second magnets 242. On the other hand, when the switching levers 243 are placed in opposition to the first magnets 241, the article holding members 212 are placed at the article holding position by the magnetic repulsive force generated between the first magnets 241 and the third magnets 244.

It should be noted that, in the shown embodiment, the magnets 241, 242 and 243 can be either permanent magnets or electromagnets.

Figure 16A:
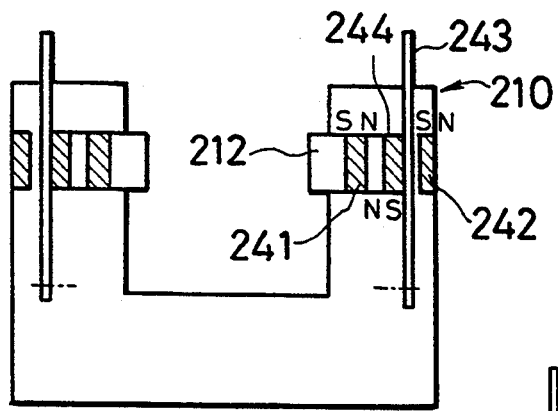
FIGS. 16(A) to 16(D) are illustration showing a still further embodiment of the article fixing and damping device according to the invention.
Figure 16B:
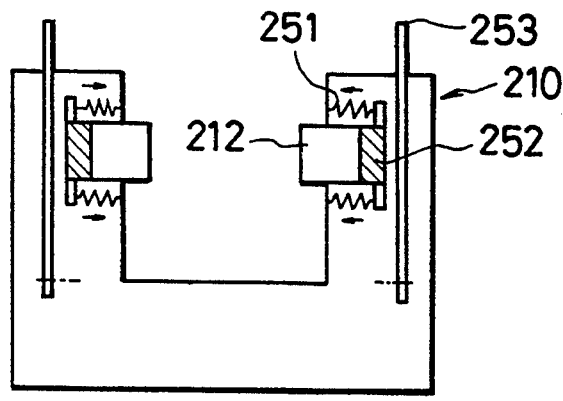

(Sixth Embodiment) (see FIG. 16(B))

The sixth embodiment is differentiated from the foregoing fourth embodiment in the following points.

In the sixth embodiment (FIG. 16B), the article holding members 212 are provided with elastic characteristics to normally urge them toward the article holding positions. The elastic characteristics may be provided by interposing springs 251 between the article holder 210 and the article holding members 212. In the alternative, the abovementioned elastic characteristics may be provided by securing the article holding members 212 on the vertically secured leaf springs for which the resilient characteristics to normally urge the article holding members 212 toward the article holding positions are provided.

On the other hand, the sixth embodiment includes magnets 252 (FIG. 16B) fixed on the article holding members 212. Switching levers 253 formed of magnetic bodies are provided in the movable fashion for movement across the position opposing to the magnets 252. The switching lever 253 is placed in opposition to the magnets 252 to generate magnetic drawing force in the direction opposite to the elastic characteristics and in a magnitude overcoming the elastic characteristics.

When the switching levers 253 are placed out of the position opposing the magnets 252, the article holding members 212 are placed in the article holding position by the elastic characteristics. On the other hand, when the switching levers 253 are placed in opposition to the magnets 252, the article holding members 212 are shifted into the article releasing position against the elastic characteristics by the magnetic drawing force generated between the switching levers 253 and the magnets 252.

It should be noted that, in the shown embodiment, either permanent magnets or electromagnets can be employed as the magnet 252.

In the shown embodiment, the article holding members 212 may be designed to have the elastic characteristics to be normally urged toward the article releasing position. In such case, the switching levers 253 are arranged to bias the article holding members 212 to the article holding position by the magnetic drawing force generated between the switching levers and the magnets 252 at the positions of the switching levers opposing to the magnets 252.

Figure 16C:
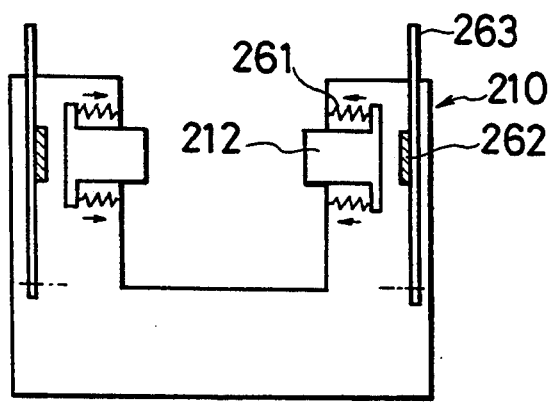

(Seventh Embodiment) (see FIG. 16(C))

The seventh embodiment is differentiated from the foregoing fourth embodiment in the following points.

In the seventh embodiment, the article holding members 212 are provided with elastic characteristics to be normally urged toward the article holding positions. The elastic characteristics may be provided by interposing springs 261 between the article holder 210 and the article holding members 212. In the alternative, the abovementioned elastic characteristics may be provided by securing the article holding members 212 on vertically secured leaf springs having resilient characteristics to normally urge the article holding members 212 toward the article holding positions.

On the other hand, the article holding member 212 of the seventh embodiment is formed of a magnetic body. Switching levers 263 are provided in a movable fashion for movement across the position opposing the article holding members 212. The switching lever 263 carries magnet 262 so that the magnet 262 may move across the position opposing to the switching lever 263. When the switching lever 263 is placed to oppose the magnet 262 to the article holding member 212, a magnetic drawing force in the direction opposite to the elastic characteristics and in a magnitude overcoming the elastic characteristics is generated.

Therefore, when the switching lever 263 is placed to position the magnet 262 out of the position opposing to the article holding member 212, the article holding members 212 are placed to the article holding position by the elastic characteristics. On the other hand, when the switching levers 263 are placed in opposition to the article holding member 212 while opposing the magnet 263 thereto, the article holding members 212 are shifted into the article releasing position against the elastic characteristics by the magnetic drawing force generated between the article holding member 212 and the magnets 262.

It should be noted that, in the shown embodiment, either permanent magnets or electromagnets can be employed as the magnet 262.

In the shown embodiment, the article holding members 212 may be designed to have the elastic characteristics to be normally urged toward the article releasing position. In such case, the magnet 262 of the switching levers 263 are arranged to bias the article holding members 212 to the article holding position by the magnetic drawing force generated between the article holding members 212 and the magnets 262 at the positions of the switching levers opposing to the article holding member 212.

Figure 16D:
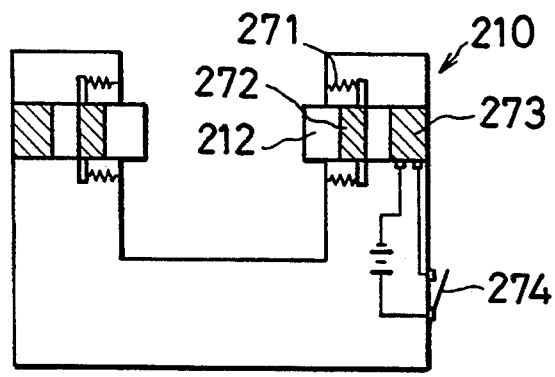

(Eighth Embodiment) (see FIG. 16(D))

The eighth embodiment is differentiated from the foregoing fourth embodiment in the following points.

In the eighth embodiment, the article holding members 212 are provided with elastic characteristics to be normally urged toward the article holding positions. The elastic characteristics may be provided by interposing springs 271 between the article holder 210 and the article holding members 212. In the alternative, the abovementioned elastic characteristics may be provided by securing the article holding members 212 on vertically secured leaf springs for which the resilient characteristics to normally urge the article holding members 212 toward the article holding positions are provided.

The eighth embodiment includes first magnets 272 fixedly secured on the article holding member 212, and second magnets 273 arranged in opposition to the first magnets 272. The first and second magnets 272 and 273 are provided opposite polarities (N and S poles) at the opposing magnetic poles. In the shown embodiment, the second magnets 273 comprise electromagnets. A switch 274 is provided for conducting and blocking power supply for the second magnets 273. When the power is supplied to energize the second magnets 273, a magnetic drawing force in the opposite direction to the elastic characteristics provided for the article holding members 212 and in the magnitude overcoming the elastic force of the elastic characteristic is generated between the first and second magnets 272 and 273.

With the construction set forth above, when the switch 274 is held OFF, the article holding members 212 are set at the article holding position by the elastic characteristics provided for the article holding members 212. On the other hand, when the switch 274 is held ON, the article holding members 212 are situated at the article releasing position against the elastic characteristics thereof by the magnetic drawing force generated between the first and second magnets 272 and 273.

In the shown embodiment, the article holding members 212 may be designed to have the elastic characteristics to be normally urged toward the article releasing position. In such case, the first magnets 272 and the second magnets 273 are arranged to generate the magnetic drawing force or magnetic repulsive force to position the article holding members 212 at the article holding position against the elastic characteristics provided for the article holding members 212. It should be noted that the first magnets can be replaced with the magnetic bodies.

Figure 17:
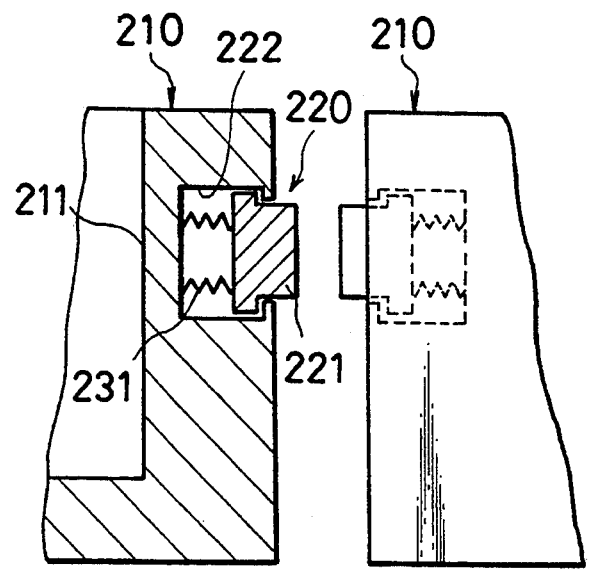
FIG. 17 is a schematic and partial illustration showing yet further embodiment of the article fixing and damping device according to the invention.

(Ninth Embodiment) (see FIG. 17)

The ninth embodiment is differentiated from the foregoing fourth embodiment in the following points.

In the shown embodiment, springs 231 are provided at the bottom portions of the guide holes 222 provided in the article holder 210, in which the damping magnets 221 are disposed in the movable fashion for movement along the transportation line. Therefore, the springs 231 are positioned behind the damping magnets 221.

With the shown construction, the damping magnets 221 are resiliently supported at the backs by means of the 231. When the damping magnets 221 are depressed in the retracting direction by energy of collision, the motion of the damping magnets 221 are resiliently restricted to enhance the damping performance.

Figure 18:
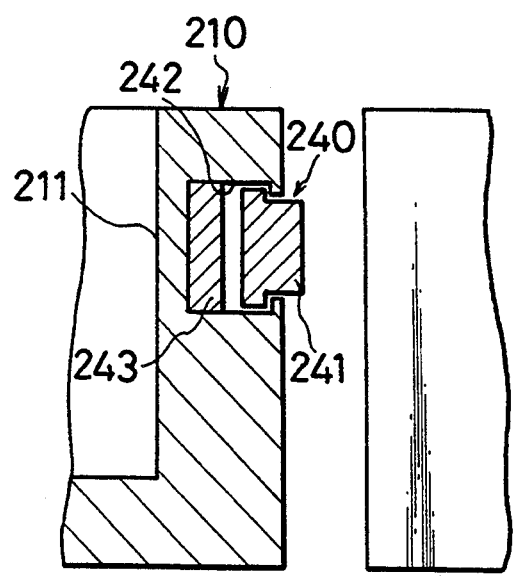
FIG. 18 is a still further embodiment of the article fixing and damping device according to the invention

(Tenth Embodiment) (see FIG. 18)

The tenth embodiment is directed to a damping device 240 for damping collision of the article holder 210 transported through the transportation line with other articles or the facility. The damping device 240 comprises damping magnet 241 which projects from the outer periphery of the article holder 210 and is inwardly movable. Namely, the damping magnet 241 is disposed within a guide hole 242 formed in the article holder 210 in the movable fashion for movement along the transportation line. At the bottom portion of the guide hole 242 of the article holder 210, a repulsing magnet 243 is fixedly arranged to oppose to the back of the damping magnet 241. The opposing magnetic poles of the damping magnets 241 and the repulsing magnets 243 are provided the same polarity (e.g. S pole) to each other.

With the shown construction, the damping device 240 can damp collision energy upon collision with other articles or the facility since the damping magnet 241 is elastically supported at the back by the repulsive force generated between the damping magnet 241 and the repulsing magnet 243, which repulsive force restricts inward movement of the damping magnet for damping the collision energy. Therefore, the shown embodiment of the damping device 240 can be effective for damping collision irrespective whether the counterpart has the similar damping device 240 or not. Since the shown embodiment produces the damping force with the magnetic repulsive force, it may not cause wearing or fatigue of elasticity as those occurring in the mechanical damping means, such as rubber, and thus can expand the lift.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An article holding device including a container for holding an article positioned in an article holding portion of said container comprising:
   a pair of article holding members arranged in opposition across said article holding portion within said container;
   each of said article holding members including a first magnetic means to which said article holding member is fixed, each said article holding member being movably supported on said container for exerting force in an article holding direction toward the other article holding member;
   a second magnetic means supported on said container adjacent said article holding member in opposition to said first magnetic means;
   said first and second magnetic means being provided with the same magnetic poles mutually opposing one another.

2. An article holding device as set forth in claim 1, wherein the pole of said second magnetic means remote from said first magnetic means is arranged proximal to the outer periphery of said article holding device.

3. An article holding device as set forth in claim 1, wherein said article holding device is portable.

4. An article holding device including a container for holding an article positioned in an article holding portion of said container comprising:
   a pair of article holding members arranged in opposition across said article holding portion within said container;
   each of said article holding members in said container including magnets for exerting force on said article in an article holding direction, at least one of said magnets being arranged proximal to the outer periphery of said article holding device.

5. An article holding device as set forth in claim 4, wherein said article holding device is portable.

6. An article holding device comprising:
   a container sized and shaped to receive at least a portion of an article to be held;
   a pair of article holders positioned opposed to each other across an article holding space in said container;
   each of said holders having a magnet and being movably supported on said container to exert article holding force in the direction of said space; and
   another magnet supported on said container adjacent the other magnet, the magnets being positioned with like poles facing each other.

7. An article holding device as set forth in claim 6, wherein said article holding device is portable.

8. An article holding device including a container for holding an article positioned in an article holding portion of said container comprising:
   a pair of article holding members arranged in opposition across said article holding portion within said container;
   at least one of said article holding members including a first magnetic means to which said article holding member is fixed, movably supported on said container for exerting force in an article holding direction toward the other article holding member;
   a second magnetic means supported on said container adjacent said article holding member in opposition to said first magnetic means;
   said first and second magnetic means being provided with the same magnetic poles mutually opposing one another, said pole of said second magnetic means remote from said first magnetic means being arranged proximal to the outer periphery of said article holding device.

9. An article holding device comprising:
   a container sized and shaped to receive at least a portion of an article to be held:
   a pair of article holders positioned opposed to each other across an article holding space in said container;
   at least one of said holders having a magnet and being movably supported on said container to exert article holding force in the direction of said space; and
   another magnet supported on said container adjacent the other magnet, the magnets being positioned with like poles facing each other, said pole of said another magnet remote from said other magnet being arranged proximal to the outer periphery of said article holding device.

* * * * *